(12) United States Patent
Busold et al.

(10) Patent No.: US 6,789,658 B2
(45) Date of Patent: Sep. 14, 2004

(54) CLUTCH SYSTEM

(75) Inventors: Thomas Busold, Fulda (DE); Hans-Jürgen Schneider, Stettbach (DE); Rainer Brand, Obereuerheim (DE); Wolfgang Reisser, Sennfeld (DE); Olaf Moseler, Würzburg (DE); Jochen Kuhstrebe, Biebelried/Westheim (DE); Wolfgang Grosspietsch, Schweinfurt (DE); Axel Rohm, Schonungen (DE); Thomas John, Sulzheim (DE); Thomas Wirth, Schwanfeld (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/237,819

(22) Filed: Sep. 9, 2002

(65) Prior Publication Data

US 2003/0047410 A1 Mar. 13, 2003

(30) Foreign Application Priority Data

Sep. 7, 2001 (DE) .......................................... 101 43 833

(51) Int. Cl.$^7$ ............................................. F16D 25/02
(52) U.S. Cl. .................. 192/103 F; 192/87.11
(58) Field of Search ................... 192/103 F, 87.11, 192/86, 87.1, 85 A, 85 CA, 109 F (56) References Cited

U.S. PATENT DOCUMENTS

| 4,236,617 A | * | 12/1980 | Whateley | 192/3.3 |
| 4,813,234 A | * | 3/1989 | Nikolaus | 60/484 |
| 5,827,145 A | * | 10/1998 | Okcuoglu | 475/88 |
| 6,397,994 B1 | * | 6/2002 | Bowen | 192/48.9 |
| 6,427,550 B1 | * | 8/2002 | Bowen | 74/336 R |

FOREIGN PATENT DOCUMENTS

| DE | 100 04 179 | 4/2001 | ........... F16D/21/06 |
| DE | 100 56 954 | 5/2002 | ......... F16D/25/062 |
| DE | 101 02 874 | 6/2002 | ......... F16D/25/062 |

\* cited by examiner

*Primary Examiner*—Saúl J. Rodriguez
(74) *Attorney, Agent, or Firm*—Cohen, Pontani, Lieberman & Pavane (57) ABSTRACT

A clutch system includes a clutch device with at least one clutch arrangement for installation in a motor vehicle drive train between a drive unit and a transmission. The at least one clutch arrangement is actuated by a slave cylinder using a pressure medium which is supplied to the clutch device by a first pump. A further medium is also supplied to the clutch device by a second pump arrangement as an operating medium used during operation of the clutch device. The further medium is selectively supplied as a pressure medium to the slave cylinder.

29 Claims, 11 Drawing Sheets

CLUTCH SYSTEM

BACKGROUND OF THE INVENTION

1. Field of the Invention

The present invention relates to a clutch system comprising at least one clutch device for installation in a motor vehicle drive train between a drive unit and a transmission, the clutch device having at least one clutch arrangement which can be actuated by a pressure medium and which is operated by the action of an operating medium, the pressure medium being provided by a first pump arrangement and the operating medium being supplied to the clutch device by a second pump arrangement.

2. Description of the Related Art

The present invention is based on a clutch system with the basic design described in German Patent Applications No. 100 56 954.4 of Nov. 17, 2000 and No. 101 02 874.1 of Jan. 23, 2001, which claims the priority of German Patent Application No. 100 56 953.7 of Nov. 17, 2000. The contents of these German patent applications are incorporated in their entirety by reference in the disclosure of the present application and the proposals made in those documents are to be considered advantageous elaborations of the clutch system according to the invention discussed here.

SUMMARY OF THE INVENTION

The clutch system according to the present invention concerns a wet-running dual clutch system with two wet-running multi-disk clutch arrangements, which can be actuated hydraulically by slave cylinders integrated into the clutch device. The clutch device in question can be, for example, a clutch device according to a design of the applicant as described in U.S. patent application Ser. No. 09/678,442, filed on Oct. 2, 2000 (now U.S. Pat. No. 6,464,059), the entire contents of which are incorporated by reference in the disclosure of the present application.

For the actuation of the multi-disk clutch arrangements, a wet-running dual clutch system of this type requires a flow of pressure medium which, averaged over time, is low in terms of volume but high in terms of pressure. The clutch also requires, however, a comparatively high volume flow rate of the operating medium at comparatively low pressure to cool the friction linings or disks. In the interest of conserving energy, a separate specially adapted pump arrangement (pump) is used for each of these two volume streams, i.e., a first pump arrangement for providing a first medium as the pressure medium and a second pump arrangement for providing a second medium as the operating medium at comparatively low pressure. Because only a small volume flow rate, averaged over time, is required to develop the pressure needed for clutch actuation, a hydraulic accumulator may be provided downstream from the first pump arrangement in question to store the required hydraulic medium. The first pump arrangement therefore requires only a pump of comparatively low delivery volume.

For the clutch system of the present invention, the second medium provided by the second pump arrangement may be selectively fed to as the pressure medium to a least one pressure-medium slave cylinder of the clutch device to actuate the clutch arrangement assigned to the slave cylinder for the purpose of either engaging it (in the case of, for example, a clutch arrangement of the NORMALLY OPEN type) or disengaging it (in the case of, for example, a clutch arrangement of the NORMALLY CLOSED type).

By prefilling or partially filling the slave cylinder with the second medium provided by the second pump arrangement with the use of a bypass around the first pump arrangement, comparatively short switching times are obtained, and a first pump arrangement with an especially low delivery volume may be used. These advantages are derived from the fact that, to fill the slave cylinder of a wet-running clutch to increase the pressure from zero to approximately 20% of the maximum pressure, it is necessary to supply about 90% of the filling volume (merely by way of example) which the slave cylinder has at maximum pressure. A fraction of the maximum pressure on the order of magnitude cited (for example, 20%) can also be produced by a typical coolant pump such as the second pump arrangement. Accordingly, the second pump arrangement may be used to prefill or partially to fill the slave cylinder to a significant extent (e.g., to the above-cited 90% of its volume), whereas the first pump arrangement is used primarily to fill the slave cylinder from that point on to produce even higher pressures.

It is also within the scope of the present invention to connect the first pump arrangement downstream from the second pump arrangement, so that the medium received by first pump arrangement is already at an elevated pressure level created at the discharge of the second pump. The pressure increase which the first pump arrangement is therefore required to produce is smaller than that which would be required if the medium were being drawn in from the pressure equalization tank or the like. Because of the lower requirements with respect to pressure, an especially low-cost pressure pump may be used. Furthermore, a separate pressure filter in the pressure circuit may be omitted in this configuration.

One of the primary goals of the present invention is to design the first pump arrangement to provide a first volume flow rate at a first pressure level and to design the second pump arrangement to provide a second volume flow rate at a second pressure level, where, under normal operating conditions, the first volume flow rate will be smaller than the second volume flow rate and the first pressure level will be higher than the second pressure level.

As indicated above, the first pump arrangement is or can be connected by its suction side to a delivery side of the second pump arrangement to draw medium provided by the second pump arrangement and to provide it as pressure medium on a higher pressure level.

As mentioned above, the second pump arrangement may be connected to the slave cylinder in parallel with the first pump arrangement to allow the slave cylinder to be prefilled or partially filled with the second medium provided by the second pump arrangement.

In this context, the slave cylinder is or may be connected to the delivery side of the second pump arrangement by an open loop/closed loop valve arrangement.

Alternatively, the slave cylinder may be connected to the delivery side of the second pump arrangement such that it bypasses an open loop/closed loop valve arrangement installed between the first pump arrangement and the slave cylinder. This latter design allows an open loop/closed loop valve arrangement with a very small effective flow cross section to be used without limiting or impairing the reduction in the switching times obtained as a result of the prefilling or partial filling.

Since the slave cylinder can be filled additionally with pressure medium provided by the first pump arrangement via the open loop/closed loop valve arrangement, an operating pressure can be reached which is higher than the delivery pressure of the second pump arrangement.

In conjunction with the prefilling or partial filling, it is also proposed that a section of the operating medium system downstream from the second pump arrangement have an effective flow cross section which is dimensioned such that a pressure level is reached on the delivery side of the second pump arrangement which allows the slave cylinder to be partially filled or prefilled to a technically relevant extent the second with medium provided by the second pump arrangement. Alternatively, at least one pressure-adjusting or pressure-increasing device may be provided in a section of the operating medium system downstream from the second pump arrangement, for setting a pressure level on the delivery side of the second pump arrangement which allows the slave cylinder to be partially filled or prefilled to a technically relevant extent with medium provided by the second pump arrangement. The pressure adjusting or pressure increasing device may comprise at least one throttle or orifice plate and/or at least one pressure-relief valve or pressure-reducing valve. Furthermore, the pressure-adjusting or pressure-increasing device may be switchable between a first state, in which it has the effect of adjusting the pressure level, and a second state, in which it does not have an adjusting effect on the pressure level. In the second state, the operating medium may then be supplied (to cool the friction linings or disks, for example) without being affected or hindered by the pressure-adjusting or pressure-increasing device of the clutch device.

The manner in which the second pump arrangement is connected to the slave cylinder for the prefilling or partial filling may be effected by many different designs. Accordingly, the slave cylinder may be connected via a pilot valve arrangement to the second pump arrangement. When this pilot valve arrangement is in a first state, it allows the medium provided by the second pump arrangement to pass to the slave cylinder partially to fill or to prefill the slave cylinder. When the pilot valve arrangement is in a second valve state, it allows essentially none of the medium provided by the second pump arrangement to pass through to the slave cylinder. The valve arrangement may, for example, comprise a 3/2-port directional valve with a further valve state in which it allows medium to flow out of the slave cylinder to empty it.

According to another embodiment, the slave cylinder is connected to the second pump arrangement via a non-return valve arrangement. The nonreturn valve arrangement may also be provided in combination with a pilot valve arrangement.

At least one pilot valve may be assigned to the slave cylinder to serve as a drain valve. When this valve, which could possibly be called an emergency discharge valve, is in a first state, it allows the medium to flow out of the slave cylinder to empty it and/or allows medium supplied by the second pump arrangement and supplied to a feed side of the slave cylinder to flow away from the feed side to hold the slave cylinder in an empty or partially emptied state. Alternatively, the effective discharge flow cross section of the open loop/closed loop valve arrangement assigned to the slave cylinder may be made large enough to allow the second medium provided by the second pump arrangement and supplied to the feed side of the slave cylinder to flow away from the feed side in order to keep the slave cylinder in an emptied or partially emptied state.

A non-return valve arrangement may be inserted between the first pump arrangement and the slave cylinder such that the discharge from a pressure reservoir via the first or second pump arrangement is blocked.

As mentioned above, the clutch arrangement may be a wet-running clutch arrangement, and the clutch of the wet-running type can be operated by the action of the operating medium. Furthermore, the operating medium may comprise an operating fluid such as a coolant. As already mentioned, the clutch arrangement may be designed as a multi-disk clutch arrangement.

With respect to the pressure medium, a hydraulic pressure medium, especially a hydraulic oil, which can also possibly serve as a coolant, will be used in most cases.

The clutch device can be multi-clutch arrangement, especially a dual clutch device, which has a first clutch arrangement and a second clutch arrangement. The first clutch arrangement has at least a first slave cylinder, and the second clutch arrangement has at least a second slave cylinder. According to the inventive proposal, medium provided by the second pump arrangement can be supplied to the two slave cylinders independently of each other, especially for the purpose of achieving the advantages discussed above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 5a is a schematic diagram of a further embodiment of clutch system according to the present invention;

FIG. 5b is a schematic diagram of a further embodiment of a pilot valve which may be used in the clutch system of FIG. 5a;

FIG. 7a is a schematic diagram of a further embodiment of clutch system according to the present invention;

FIG. 7b is a schematic diagram of a further embodiment of a valve which may be used in the clutch system of FIG. 7a;

FIG. 8a is a schematic diagram of a further embodiment of clutch system according to the present invention;

FIG. 8b is a schematic diagram of a further embodiment of a valve which may be used in the clutch system of FIG. 8a;

FIG. 9a is a further schematic diagram of a further embodiment of clutch system according to the present invention;

FIG. 9b is a schematic diagram of a further embodiment of a valve which may be used in the clutch system of FIG. 9a;

FIG. 10a is a schematic diagram of a further embodiment of clutch system according to the present invention;

FIG. 10b is a schematic diagram of a further embodiment of a valve which may be used in the clutch system of FIG. 10a;

FIG. 11a is a schematic diagram of yet another embodiment of clutch system according to the present invention; and FIG. 11b is a schematic diagram of a further embodiment of a valve which may be used in the clutch system of FIG. 11a.

DETAILED DESCRIPTION OF THE PRESENTLY PREFERRED EMBODIMENTS

Figure 1:
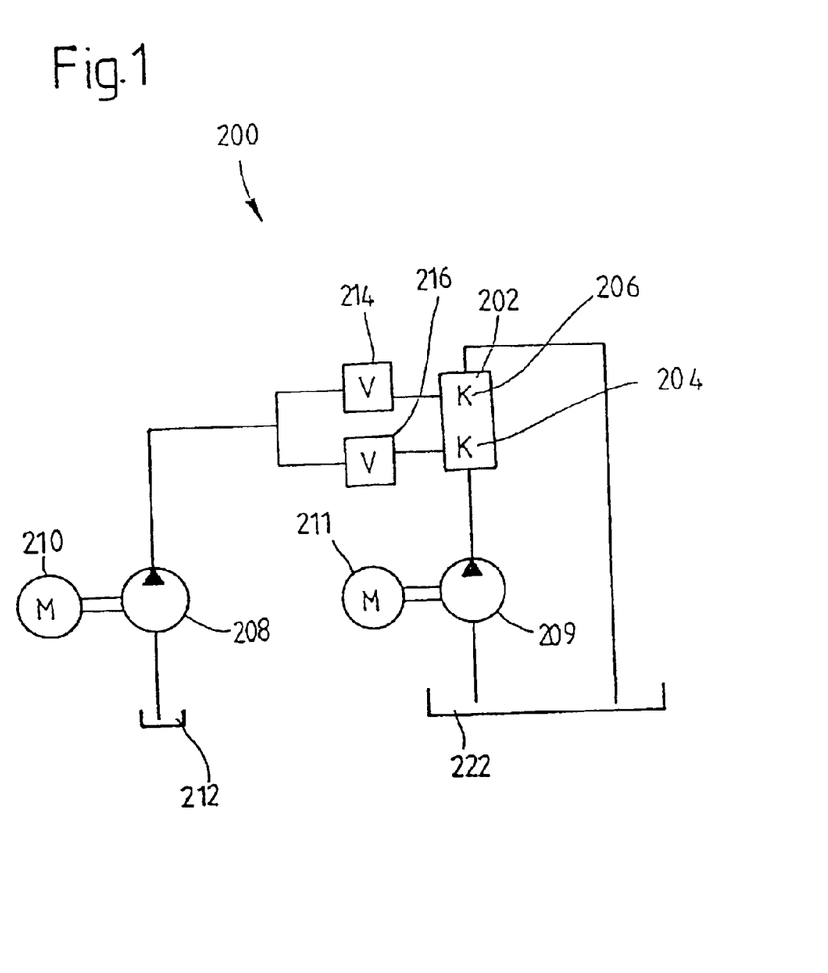
FIG. 1 is a schematic diagram of the basic design of a clutch system with a wet-running dual clutch according to the present invention.

FIG. 1 is a schematic diagram of a clutch system 200 that includes a wet- running dual clutch 202 with a first radially outer clutch arrangement 206 and a second radially inner clutch arrangement 204. The first and second clutch arrangements 204 and 206 are wet- running type such as wet-running multi-disk clutch arrangements. Each of the first and second clutch arrangements 204 and 206 has at least one set of disks, one set being arranged radially above the other in the present embodiment, and each of which is actuated by an associated actuating piston of a hydraulic slave cylinder integrated into the dual clutch. Examples of dual clutches of this type are disclosed in U.S. Patent Application Serial No. 09/678,442, filed on Oct. 2, 2000 (now U.S. Pat. No. 6.464.059).

The clutch system 200 also includes two independent pumps, namely, a first pump 208 and a second pump 209, which are preferably driven by separate electric motors 210, 211. The first pump 208 may, for example, be designed as a hydrostatic pump or a positive-displacement machine and provides a pressure medium such as a hydraulic oil, at a pressure high enough to actuate the first and second clutch arrangements 204 and 206 of the dual clutch 202. A hydraulic slave cylinder of each one of the first and second clutch arrangements 204 and 206 is connected to the first pump via an assigned valve 214, 216 so that the clutch arrangement to be actuated can be selected. The first pump 208 draws pressure medium from a supply tank 212 such as an oil sump or some other type of reservoir.

The second pump 209 may, for example, be designed as a hydrodynamic pump or turbo machine and provides a comparatively large volume flow rate of coolant, especially cooling oil at a lower pressure level, relative to the pressure output by the first pump 208, which serves to cool the first and second clutch arrangements 204, 206. The second pump 209 draws coolant such as, for example, oil from a supply tank 222 such as an oil sump or other type of reservoir. It should be noted that it is not necessary for the supply tank 222 to be different from supply tank 212.

Figure 2:
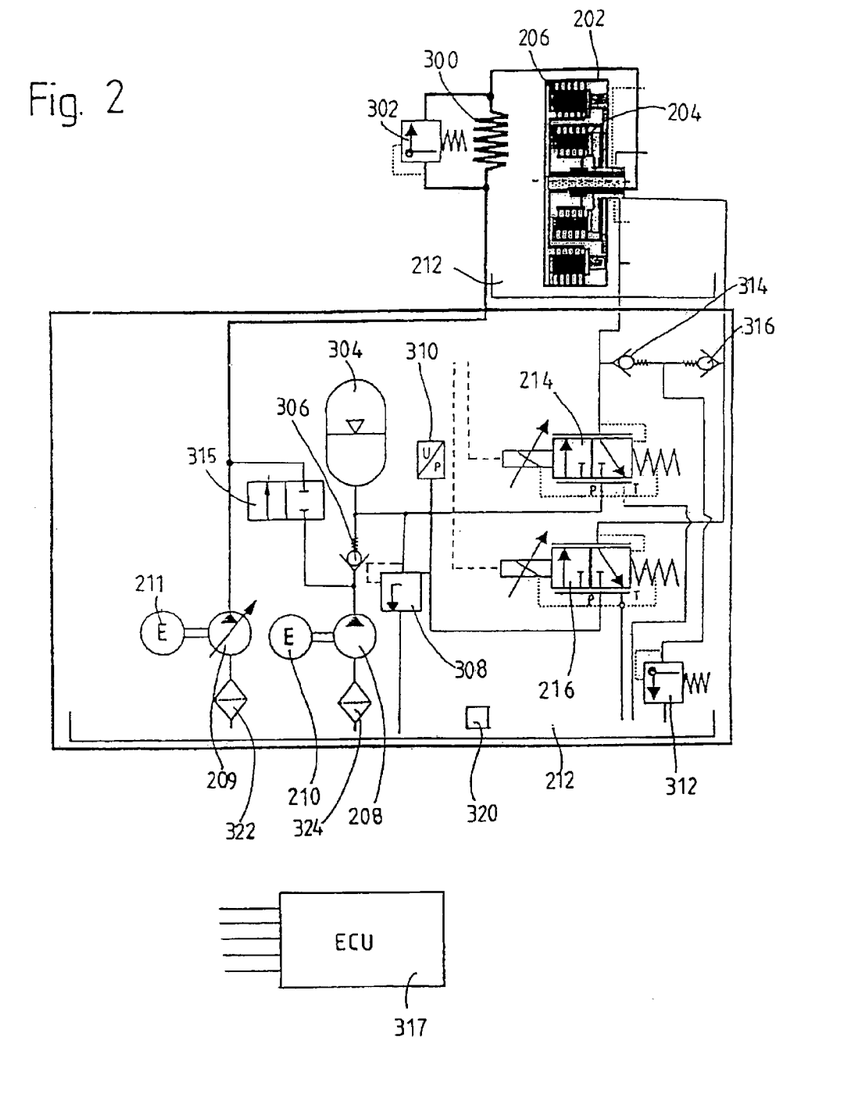
FIG. 2 is a more detailed schematic diagram of a clutch system according to the present invention based on the design of FIG. 1.

FIG. 2 is a more detailed diagram of an embodiment of a clutch system of the basic design shown in FIG. 1. According to FIG. 2, the cooling oil is supplied to the dual clutch 202 via a heat exchanger 300 because it is possible for the temperature of the oil even the oil in the supply tank 212, to increase significantly when the clutch is slipping for prolonged periods of time. The heat exchanger 300 keeps the temperature of the oil at a level sufficient to cool the dual clutch 202. Furthermore, the cooling oil can become quite viscous at lower temperatures thereby increasing the flow resistance of the heat exchanger 300 at very low temperatures thereby preventing a sufficient amount of cooling oil to reach the dual clutch. In addition, an excessive oil pressure may develop in the heat exchanger at low temperatures which could lead to damage. Accordingly, a bypass valve 302, which may, for example, be preloaded by a spring is provided which opens when the cooling oil pressure downstream of the oil cooler 300 exceeds a predetermined pressure threshold and thus allows the cooling oil to bypass the oil cooler 300 on its way to the dual clutch 202.

In the embodiment shown in FIG. 2, a hydraulic-oil reservoir 304 with a pressurized gas cushion is installed in the clutch-actuating hydraulic-oil circuit. The reservoir 304 is loaded by the first pump 208 through a non-return valve 306 and is connected via the valve 214 and the valve 216 to actuating slave cylinders of the first and second clutch arrangements 204, 206. The hydraulic-oil reservoir 304 ensures a uniform pressure level, which is especially useful when the first pump 208 is designed as a piston pump. Furthermore, the first pump 208 is only required to pump a very small delivery volume when the hydraulic-oil reservoir 304 is used. The volume of oil delivered per unit time by the pump 208 may therefore be smaller than the volume of hydraulic oil required per unit of time during the actuation of the clutch.

The hydraulic-oil circuit between the non-return valve 306 and the valves 214, 216 is protected by a pressure-relief valve 308 against damage which could be caused by excessive hydraulic oil pressure. The pressure in this hydraulic-oil circuit, which is determined by the level of oil in the reservoir 304, is detected by a pressure sensor 310.

Another pressure-relief valve 312 ensures that the pressure prevailing on the other side of the valves 214 and 216 and acting on the hydraulic slave cylinders of the clutch devices does not exceed a maximum value to prevent damage which may be caused by excessive pressure. The two non-return valves 314, 316 allow one pressure-relief valve to monitor the operating pressure of both hydraulic slave cylinders.

In the event that the pressure of the cooling oil is insufficient to cool the clutch at low temperatures, i.e., at high viscosities of the oil, because, for example, the hydrodynamic pump used as second pump 209 cannot generate enough pressure, a valve 315 is provided to branch off a small stream from the hydraulic oil stream provided by the first pump 208 to provide a kind of "emergency cooling" for the clutch arrangements when this proves necessary. Because the high viscosity of the cooling oil which makes it necessary for valve 315 to be opened occurs only at low temperatures, at which the need to cool the dual clutch is limited in any case, a relatively small "emergency cooling stream" provides sufficient cooling. This "emergency cooling", furthermore, is required only until the temperature of the oil and the viscosity of the oil are high enough to allow the second pump 209 to reach a sufficient output. Instead of a valve 315, an orifice plate, throttle or similar element, may also be used via which a small volume flow rate can branched off continuously from the hydraulic oil stream provided by the first pump 208 and conducted into the coolant circuit. If the valve 315 which branches off the cooling oil only when needed is provided, the first pump 208 may be operated in overload mode for short periods to provide sufficient cooling oil in the short time it takes for the oil to heat up sufficiently. Because only very short periods of time are usually involved where this need exists, the service life of the first pump 208 is not significantly reduced.

FIG. 2 also shows an electronic control unit (ECU) 317, which actuates the valves 214, 216 (shown as open loop/closed loop valves) as a function of a command variable. The control unit 317 may also receives measurement values from various sensors, such as from the pressure sensor 310 and other pressure sensors, and from temperature detectors or sensors. In particular, one or more temperature sensors may be used to detect the temperature of the clutch cooling oil circuit, for example, at the pump 209, the cooler 300, the bypass valve 302, the clutch device 202, and/or the supply tank 212. A corresponding sensor 320 located, for example, in the clutch oil sump 212 and which detects the temperature of the circulating oil or of the oil in the sump is illustrated schematically. On the basis of, for example, a temperature signal detected by the sensor 320, the electronic control unit 317 may also control the delivery volume of the second pump 209 per unit time and/or the volume flow rate let through by a volume flow rate adjusting valve installed in the circuit (not shown). In this way, the temperature balance of the clutch device 202 or of the clutch cooling oil circuit may be adjusted. By setting the circulation rate in the coolant circuit, the cooling rate in the cooler 300 can be adjusted (a larger or smaller ΔT at the cooler), and it is thus also possible to take advantage of turbulent flow conditions in some cases and of laminar flow conditions in others.

FIG. 2 further shows oil filters 322 and 324 connected to the suction side of the second pump 29 and first pump 208, respectively.

Figure 3:
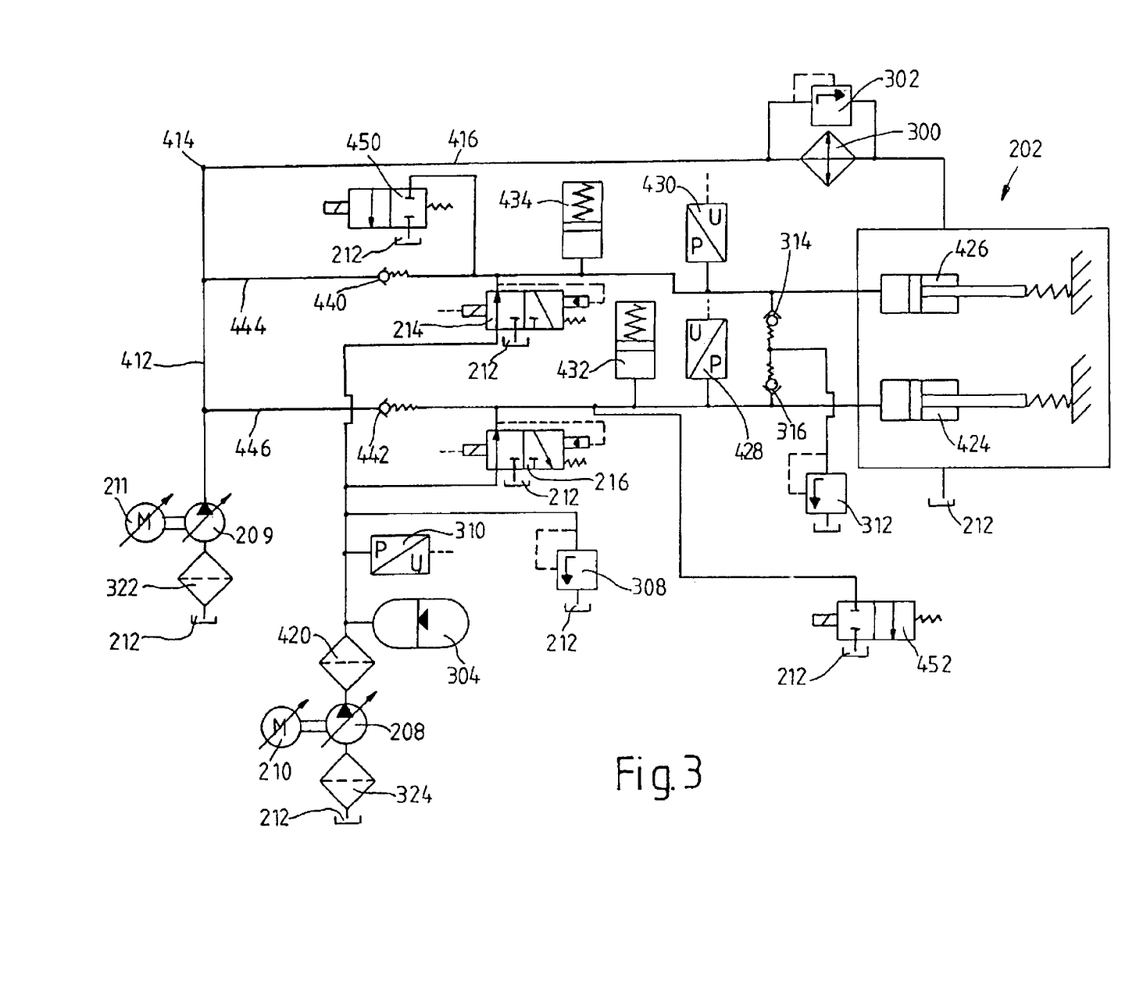
FIG. 3 is a schematic diagram of a further embodiment of clutch system according to the present invention.

Exemplary embodiments of clutch systems according to the present invention, are illustrated schematically in FIGS. 3-11 and are explained below. The meaning of most of the components shown in these Figures may be derived by the expert directly from the Figures on the basis of the preceding description of FIGS. 1 and 2, because the same reference numbers as those in FIGS. 1 and 2 are used for the same or similar components. The general design of the exemplary embodiment of FIG. 3 is therefore explained below only in brief, before an explanation is then given of the various embodiments of the invention. With respect to FIGS. 4-12, only the differences with respect to the previously explained embodiments will be described.

According to FIG. 3, a motor 211 such as, for example, a speed-controlled motor, drives the second pump 209, the delivery rate of which may be automatically controlled, and supplies coolant medium to the dual clutch 202 via lines 412 (extending from the pump 209 to point 414) and 416 (extending from point 414 to the dual clutch 202 and including the cooler 300 or the bypass valve 302). The coolant is drawn in from the supply tank 212 such as an oil sump and is filtered through a suction filter 322. The cooler 300 cools the coolant. At excessive pressures, caused by too high a viscosity of the operating medium at low temperatures, the coolant is conducted through the bypass valve 302 and around the cooler 300.

The operating medium, especially the hydraulic medium, for supplying and driving the clutch, is conveyed by the first pump 208 which may comprise an automatically controlled output. The first pump is driven by, for example, a speed-controlled motor 210. The delivered medium, corresponding to the coolant in this exemplary embodiment, is drawn from the supply tank 212, prefiltered through the suction filer 324, and fine-filtered through the pressure filter 420. The suction filters 322 and 324 could be constituents of a common suction filter.

A hydraulic accumulator 304 stores pressure medium and/or serves as a pulsation damper. However, the use of this hydraulic accumulator 304 is not required and may therefore be omitted.

A pressure sensor 310 measures the pressure in the pressure circuit. If the pressure accumulator 304 is in the circuit, the pressure sensor 310 may be used to adjust the filling volume of the accumulator. A pressure-relief valve 308 limits the pressure in the pressure circuit. If a hydraulic accumulator 304 is not provided, the pressure sensor 310 and the pressure-relief valve 308 will usually be omitted.

The valves 214 and 216 (shown as open loop/closed loop valves in FIG. 3) control or automatically regulate the pressure in slave cylinders 424 and 426, which are assigned to the first and second clutch arrangements 204, 206 of the dual clutch 202. In the present case, it is assumed that the operating pressure of these slave cylinders 424, 426 is regulated automatically. For this purpose, pressure sensors 428 and 430 are provided on the delivery sides of the valves 214, 216, respectively. Pulsation dampers 432 and 434 absorb pressure peaks and thus allow reliable automatic adjustment of the pressure to the nominal value. The pressure-relief valve 312 in conjunction with the non-return valves 314, 316 protects the dual clutch 202 against excessive pressure.

Feed connections are provided in the embodiment according to FIG. 3 between the delivery side of the second pump 209 (coolant pump) and the slave cylinders 424, 426. These connections include non-return valves 440 and 442 and the lines 444, 446, which branch from line 412. Through these feed connections, the slave cylinders are prefilled or partially filled with coolant provided by the second pump 209 (the coolant fed to the slave cylinders then serves as pressure medium) when the clutch is actuated to cause the excursion of piston rods from the slave cylinders 424, 426.

During a shifting operation, the coolant pump will usually be powered up to the maximum to cool the clutch linings. Because the line 416 will usually be considerably longer than the line 412 for design reasons, the pressure will, under this assumption, increase in the line 412. This increase in pressure is sufficient to prefill the slave cylinder.

Because the applied pressures can be greater than the pressures at which the clutch arrangements begin to transmit torque (in the case of a clutch of the NORMALLY OPEN type), it should be ensured that the effective flow cross sections in the open loop/closed loop valves 214, 216, which are the parameters which determine the discharge of pressure medium to the supply tank 212, are greater than the corresponding cross sections of the nonreturn valves 440, 442. For safety reasons, emergency drain valves 450, 452 (e.g., designed as ON/OFF valves or pilot valves) may also be provided which allow the pressure medium to be drained from the slave cylinders or from the feed side of the slave cylinders to the supply tank 212.

Figure 4:
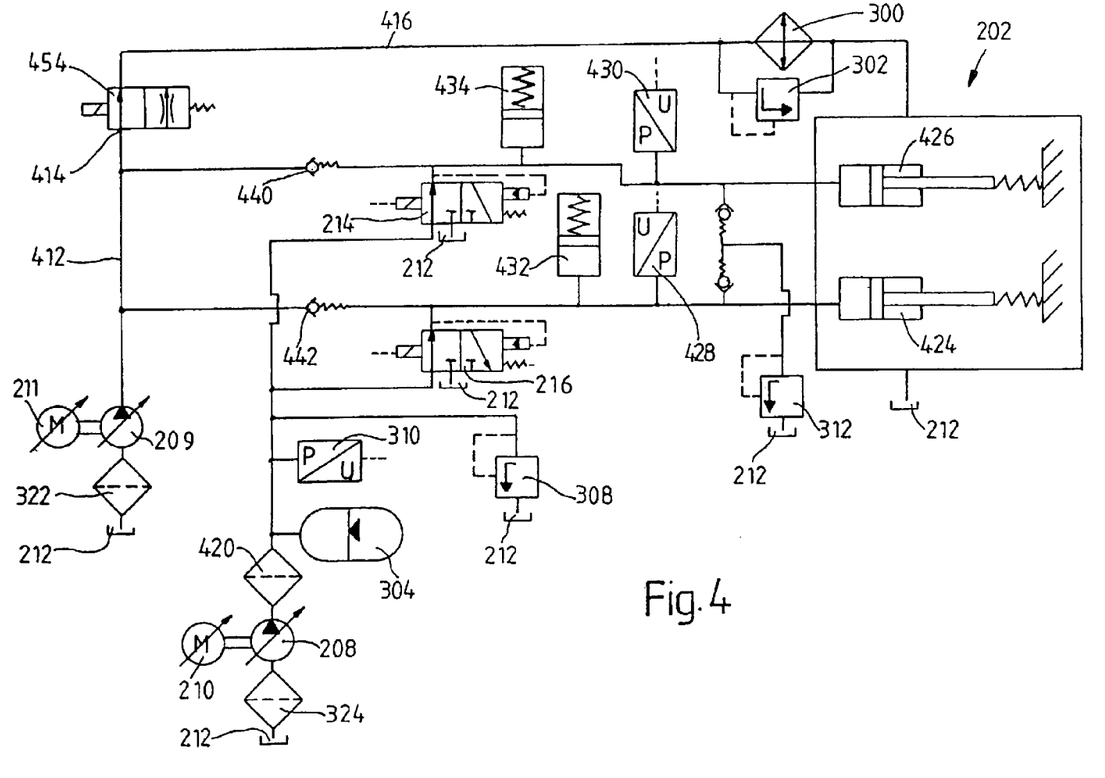
FIG. 4 is a schematic diagram of a further embodiment of clutch system according to the present invention.

In the embodiment of FIG. 4, a throttle or orifice plate 454 is installed in the line 416 to increase the pressure in the area of the line 412. This throttle or orifice plate 454 is preferably designed as a switchable throttle or orifice plate, as shown in FIG. 4, so that it is possible, by switching the throttle or orifice plate 454 appropriately, to increase the pressure in the line 412 only when the clutch is actuated. Since the throttle or orifice plate must be switched effectively only for a short period at any one time (i.e., only in conjunction with an actuation of the clutch) there is only a brief reduction in the flow of coolant. Accordingly, the cooling effect with respect to the friction linings of the dual clutch is impaired to only an insignificant degree and thus no harmful effect on the clutch linings occur.

Figures 5A, 5B:
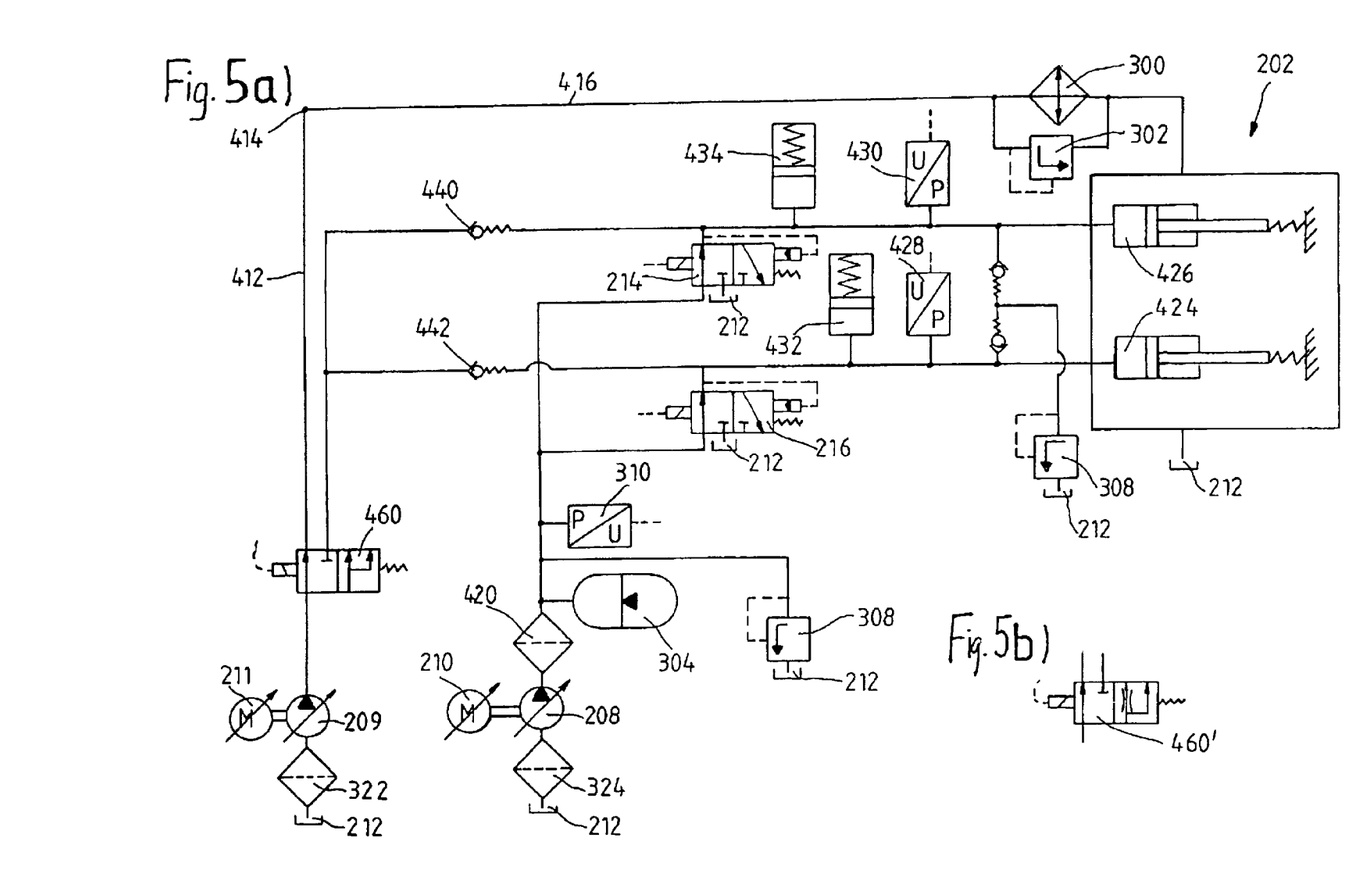

With respect to the prefilling or partial filling of the slave cylinders by the second pump 209, a pilot valve 460 may be installed downstream from the coolant pump 209 as shown in the embodiment of FIG. 5. A portion of the coolant flow is selectively conducted directly through the non-return valves 440, 442 to the slave cylinders 424, 426 via the pilot valve 460 and may thus be used for prefilling. The volume flow rate used for the cooling the dual clutch 202 may be throttled by a throttle or orifice plate (especially a switchable throttle or orifice plate) installed in line 416. Alternatively, a pilot valve 460' as shown in FIG. 5b with an appropriate throttling point may be used in place of the pilot valve 460. The cooling oil flow being supplied to the dual clutch is throttled in valve 460' only when the connection to the non-return valves 440, 442 has been effectively switched.

The use of the throttles mentioned above, whether in the line 416 or in a corresponding pilot valve, ensures the desired increase in pressure on the delivery side of the second pump 209, regardless of the flow cross sections of the selected components and the regardless of the length of the line 416.

Figure 6:
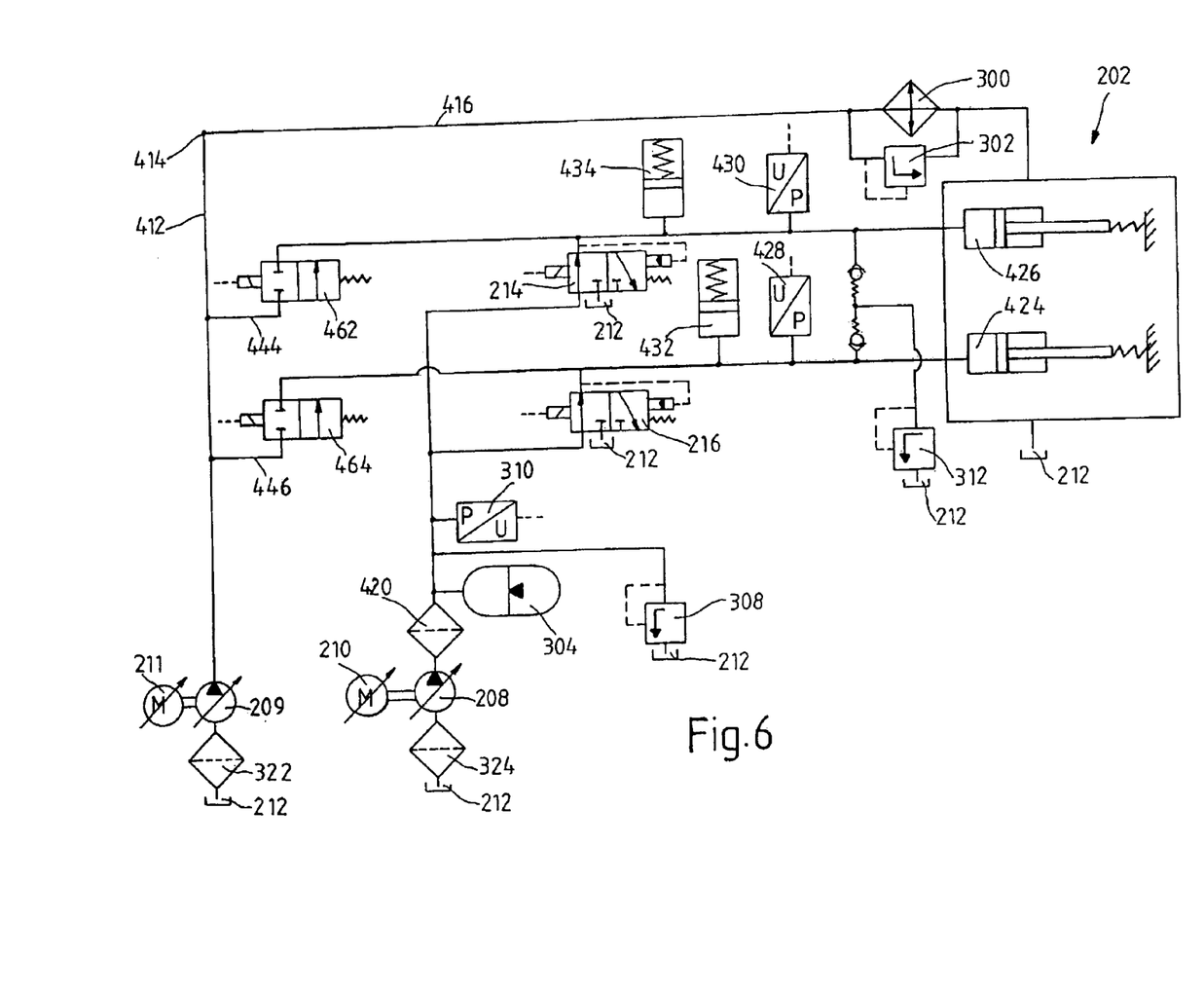
FIG. 6 is a schematic diagram of a further embodiment of clutch system according to the present invention.

In the embodiment according to FIG. 6, two pilot valves 462, 464 are provided, which, as needed, allow oil to be supplied from the cooling oil circuit to the slave cylinders. A non-return valve corresponding to the non-return valve 440, 442 may be connected downstream from each of these valves to prevent backflow of pressure medium from the pressure circuit into the coolant circuit. To guarantee adequate pressure on the delivery side of the second pump 209 (i.e., in the line 412), the buildup in pressure in the line 416 and/or to use a throttle or orifice plate arrangement may be used.

Figures 7A, 7B:
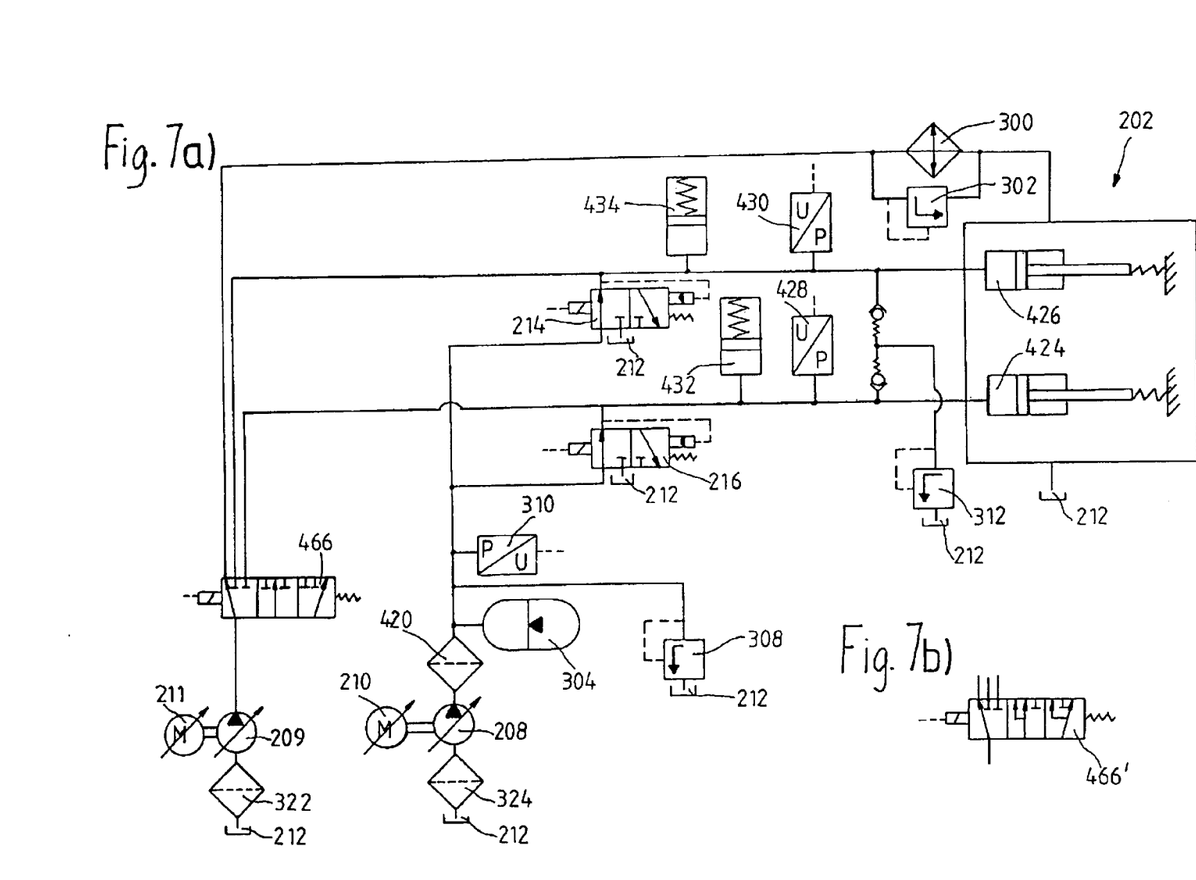

FIG. 7a is a variation of the embodiment of FIG. 4, in which a 4/3-port directional control valve 466 is provided instead of the pilot valves 462 and 464. This directional control valve is used to supply the flow of medium provided by the second pump 209 as desired either to the dual clutch 202 or to the slave cylinder 424 or to the slave cylinder 426. Thus, when the clutch is actuated and the associated slave cylinder is prefilled or partially filled with coolant, the flow of coolant being supplied to cool the dual clutch 202 is interrupted. Brief interruptions in the flow of coolant, however, are normally not a problem. To ensure a continuous flow of coolant to the dual clutch even during the partial filling or prefilling process, FIG. 7b shows that a valve 466' that may be provided instead of the valve 466, which includes a throttling function corresponding to the embodiment of FIG. 5b for the coolant flow supplied to the dual clutch.

Figures 8A, 8B:
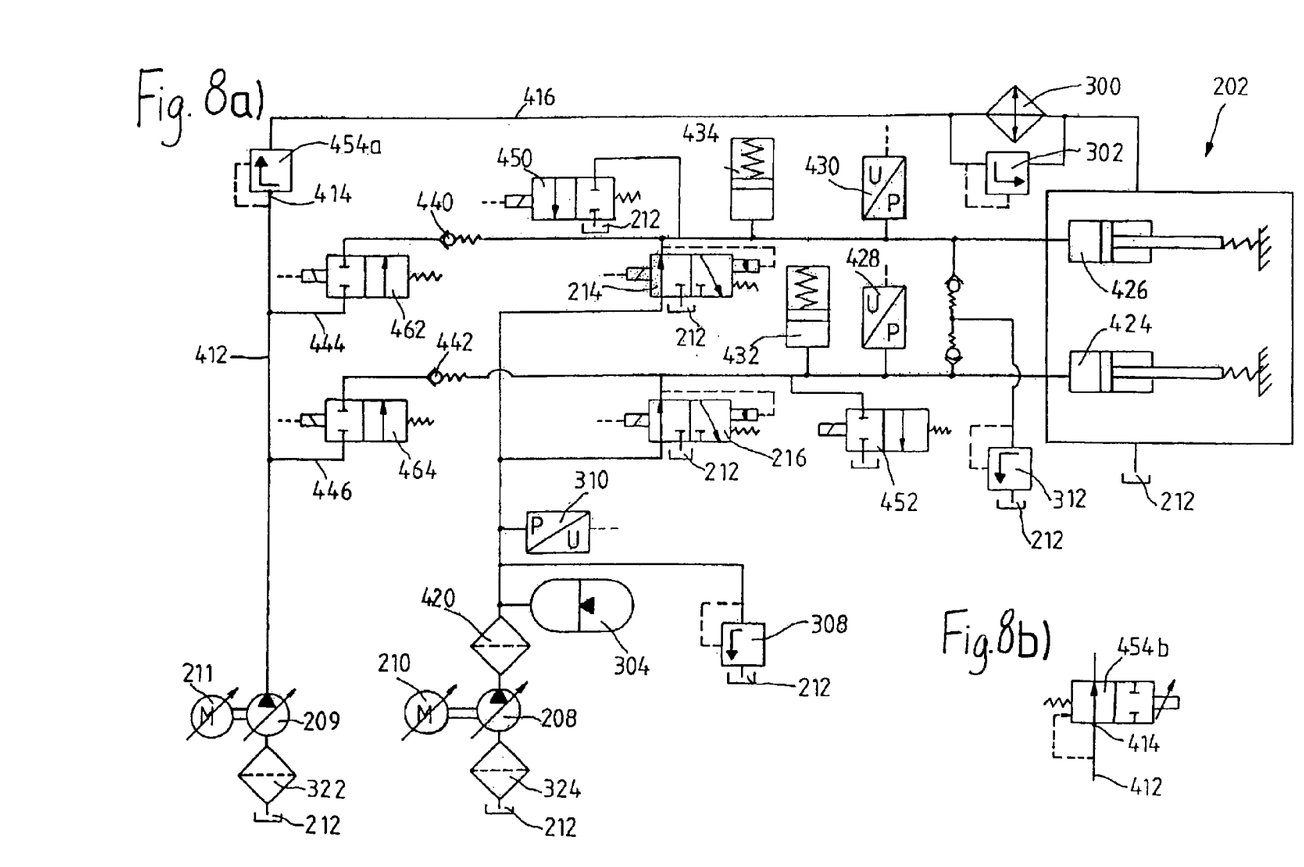

FIGS. 8a and 8b show embodiments of a clutch system according to the invention in which a pressure-relief valve or a pressure-reducing valve 454a (FIG. 8a) or an electrically controlled pressure-relief valve or pressure-reducing valve 454b (FIG. 8b) is assigned to the line 416 instead of a throttle or orifice plate to bring the pressure in the line 412 to the clutch prefilling pressure or keep the pressure in that line at the prefilling pressure.

Figures 9A, 9B:
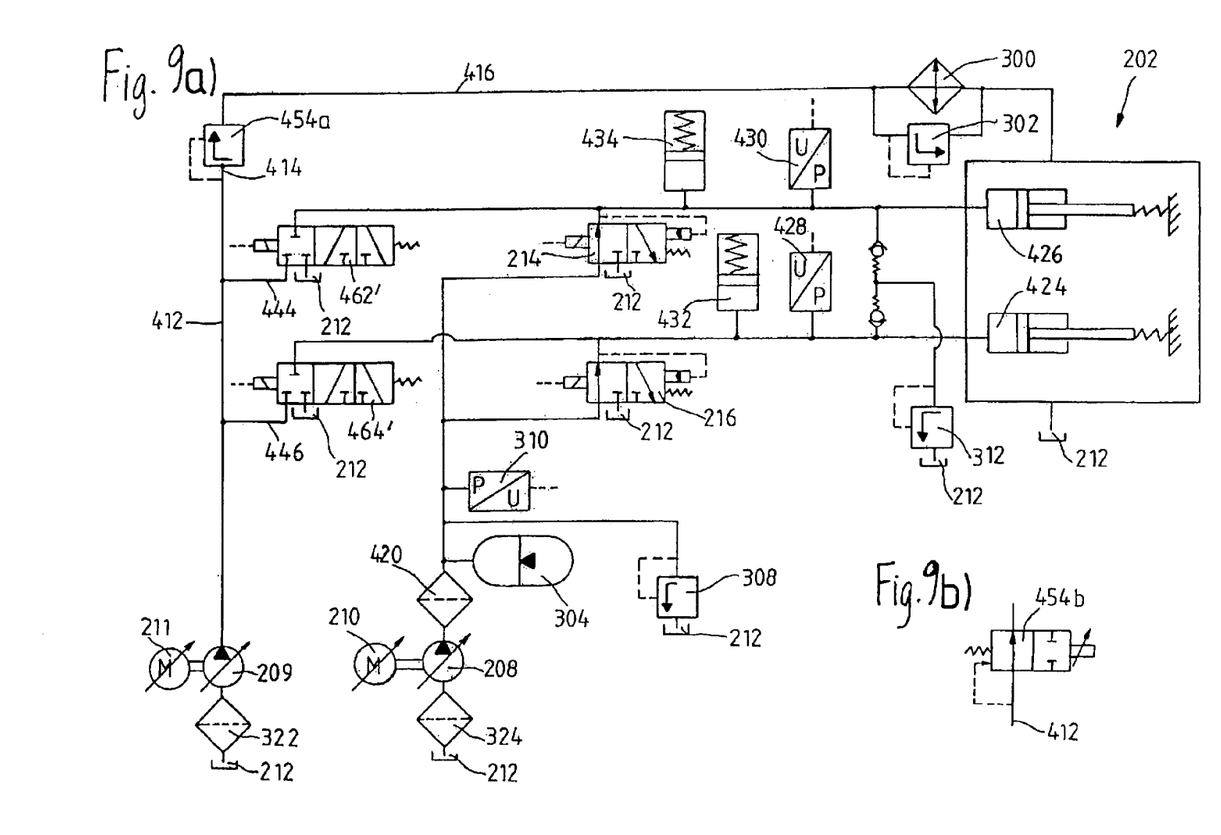

FIG. 9a shows modifications of the embodiment according to FIG. 8a in which the functions of the pilot valve 462 and the emergency drain valve 450 are combined into a 3/3-port directional control valve 462', and the functions of the pilot valve 464 and the emergency drain valve 452 are combined into a 3/3-port directional control valve 464'. As in the embodiment of FIGS. 8a and 8b, the valve 454b may be used instead of the valve 454a as shown in FIG. 9b.

Figures 10A, 10B:
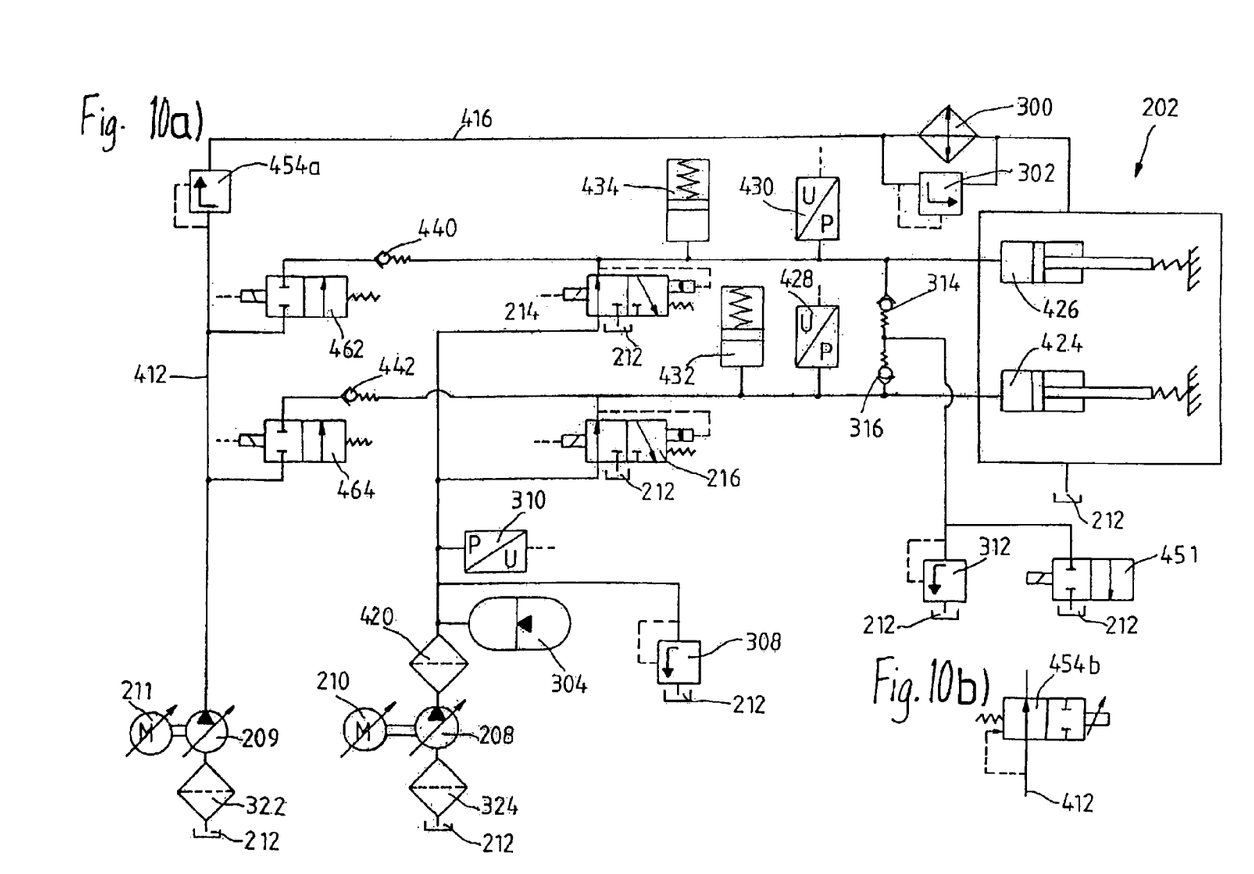

In the embodiment according to FIG. 10a, which also is to be interpreted as a design variant of the example of FIG. 8a, a common emergency discharge valve 451 is provided for both slave cylinders 424, 426, this valve being connected in parallel with the pressure-relief valve 312 and connected via the non-return valves 314, 316 to the slave cylinders. As in the embodiment of FIGS. 8a and 8b, the valve 454b may be used instead of the valve 454a as shown in FIG. 10b.

It should also be mentioned that, in all of the exemplary embodiments described above, the suction filters 322 and 324 can be constituents of a common suction filter assigned to both medium circuits.

Figures 11A, 11B:
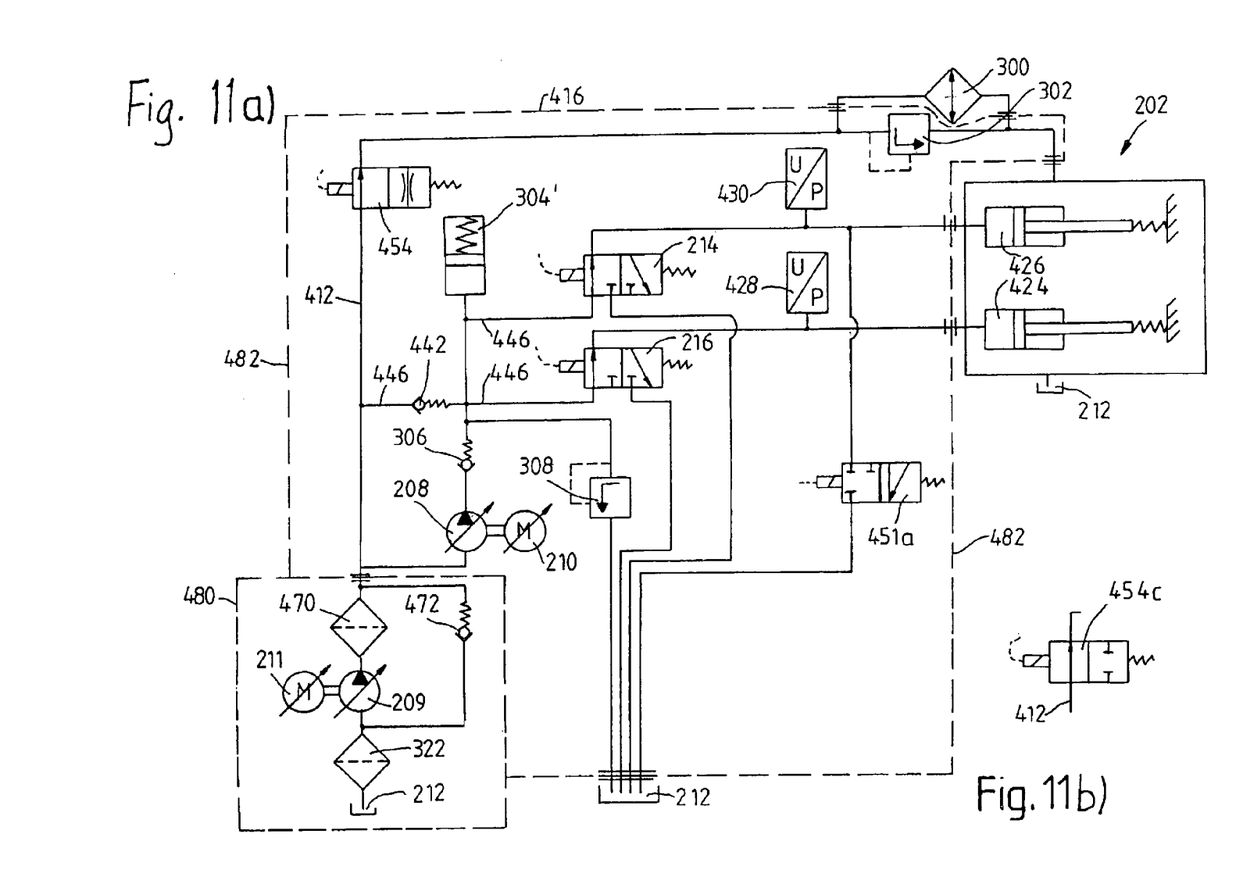

FIG. 11a shows an embodiment in which the first pump 208 is a hydraulic-oil pump that draws cooling oil which has been provided by the second pump 209 and fine-filtered through a fine filter 470. As a result, the pressure filter and the fine filter in the pressure circuit can be omitted. In addition, a pressure higher than the pressure in the supply tank 212 is already present on the suction side of the first pump 208. A non-return valve 472 allows the first pump 208 to continue to draw oil from the supply tank 212 (via the filter 322) if the second pump 209 fails.

Non-return valve 306 prevents the backflow of hydraulic oil from the pressure circuit to the first pump 208. A valve of this type can also be provided in the other exemplary embodiments according to FIGS. 3-10. To supply the slave cylinders 424, 426 with coolant for their prefilling, a feed connection bypassing the first pump 208 is provided, which comprises the non-return valve 442 and the line arrangement 446. In contrast to the embodiments according to the invention described above, the prefilling or partial filling of the slave cylinders occurs via the open loop/closed loop valves 214, 216 in the exemplary embodiment of FIG. 11a. The non-return valve 442 prevents hydraulic oil from flowing back from the pressure circuit into the coolant circuit.

A 3/2-port directional control valve 451a is provided as an emergency discharge valve in the embodiment of FIG. 11a. This valve is assigned to the two slave cylinders 424 and 426. Instead of a hydraulic accumulator, only a pulsation damper 304' is provided in the embodiment of FIG. 11a, which damps pressure fluctuations in the pressure circuit but has no specific accumulating function.

According to FIG. 11b, a simple pilot valve 454c is provided instead of the switchable throttle or orifice plate 454 to briefly block the coolant flow through the dual clutch for the prefilling or partial filling of the slave cylinders.

It should also be mentioned that, in all of the exemplary embodiments, a modular design for the clutch system, especially for the coolant and pressure medium circuits, is preferred. Thus, as shown in FIG. 11a, the components located inside the dashed line box 480 and the components located inside the dashed-line box 482 are each part of a module, which is attached, for example, to the transmission. The two modules can be connected to each other by a hydraulic line or a hydraulic hose. One possibility is to integrate the components inside the boxes 480 and 482 into the housings of the associated oil pumps 209, 210 or into separate housings.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch system, comprising:
a clutch device for installation in a motor vehicle drive train between a drive unit and a transmission, said clutch device comprising at least one clutch arrangement;
a first pump arrangement for providing a first medium to said clutch device as a pressure medium, wherein said at least one clutch arrangement is actuated by the pressure medium;
a second pump arrangement for providing second medium to said clutch device as an operating medium during operation of said clutch device; and
a pressure medium slave cylinder for actuating said at least one clutch arrangement, wherein said second medium is selectively supplied by said second pump arrangement to said pressure medium slave cylinder as said pressure medium, and wherein said first pump arrangement provides said first medium at a first volume flow rate and at a first pressure level and said second pump arrangement provides said second medium at a second volume flow rate and at a second pressure level, said first volume flow rate being smaller than said second volume flow rate and said first pressure level being higher than said second pressure level in a normal operating state of said clutch system.

2. The clutch system of claim 1, wherein each of said first and second pump arrangements comprise a suction side and a delivery side, the suction side of said first pump arrangement is connected to the delivery side of said second pump arrangement such that said first pump arrangement draws the second medium provided by said second pump arrangement feeds said second medium as said pressure medium at an increased pressure level.

3. The clutch system of claim 1, further comprising a non-return valve arrangement between said first pump arrangement and said slave cylinder for preventing a flow of pressure medium from said slave cylinder to said first pump arrangement.

4. The clutch system of claim 1, wherein said clutch arrangement comprises a wet-running clutch arrangement having a wet-running operation under the action of the operating medium and the operating medium comprises an operating fluid.

5. The clutch system of claim 4, wherein said operating fluid comprising a coolant.

6. The clutch system of claim 1, wherein said clutch arrangement comprises a multi-disk clutch arrangement.

7. The clutch system of claim 1, wherein said pressure medium comprises a hydraulic pressure medium.

8. The clutch system of claim 7, wherein said hydraulic pressure medium comprises a hydraulic oil.

9. The clutch system of claim 1, wherein said clutch device comprises a multi-clutch device having a first clutch arrangement and a second clutch arrangement, and first and second slave cylinders for actuating said first and second clutch arrangements, respectively, wherein said second medium is independently selectively supplied as a pressure medium by said second pump arrangement to said first and second slave cylinders.

10. A clutch system, comprising:
a clutch device for installation in a motor vehicle drive train between a drive unit and a transmission, said clutch device comprising at least one clutch arrangement;
a first pump arrangement for providing a first medium to said clutch device as a pressure medium, wherein said at least one clutch arrangement is actuated by the pressure medium;
a second pump arrangement for providing second medium to said clutch device as an operating medium during operation of said clutch device; and
a pressure medium slave cylinder for actuating said at least one clutch arrangement, wherein said second medium is selectively supplied by said second pump arrangement to said pressure medium slave cylinder as said pressure medium, and wherein said second pump arrangement is selectively connected in parallel with said first pump arrangement to said slave cylinder such that said slave cylinder is at least partially filled with the second medium provided by said second pump arrangement.

11. The clutch system of claim 10, further comprising an open loop/closed loop valve arrangement for selectively connecting said slave cylinder to said second pump arrangement so that said slave cylinder receives said second medium from said second pump arrangement.

12. The clutch system of claim 10, further comprising an open loop/closed loop valve arrangement inserted between said first pump arrangement and said slave cylinder, wherein said slave cylinder is selectively connected to said second pump arrangement, bypassing said open loop/closed loop valve arrangement.

13. The clutch system of claim 11, wherein said slave cylinder is additionally tilled by the pressure medium provided by the first pump arrangement via said open loop/closed loop valve arrangement so that an operating pressure In said slave cylinder exceeds the delivery pressure of said second pump arrangement.

14. The clutch system of claim 12, wherein said slave cylinder is additionally filled by the pressure medium provided by the first pump arrangement via said open loop/closed loop valve arrangement so that an operating pressure in said slave cylinder exceeds the delivery pressure of said second pump arrangement.

15. The clutch system of claim 10, further comprising an operating medium system for delivering the operating medium to the clutch device, wherein a section of said operating medium system downstream from said second pump arrangement has an effective flow cross section dimensioned such that a pressure level is reached on the delivery side of said second pump arrangement that is greater than the pressure level of the operating medium required in the clutch device, thereby allowing a technically relevant partial filling of said slave cylinder with said second medium provided by said second pump arrangement.

16. The clutch system of claim 10, further comprising an operating medium system for delivering the operating medium to the clutch device, wherein a section of said operating medium system downstream from said second pump arrangement includes at least one pressure-adjusting device for producing a pressure level on the delivery side of said second pump arrangement that is greater than the pressure level of the operating medium required in the clutch device, thereby allowing a technically relevant partial filling of said slave cylinder with said second medium provided by said second pump arrangement.

17. The clutch system of claim 16, wherein said pressure-adjusting device comprises a pressure-increasing device.

18. The clutch system of claim 16, wherein said pressure adjusting device comprises at least one of a throttle, orifice plate and a pressure-relief valve.

19. The clutch system of claim 16, wherein said pressure-adjusting is selectively switched between a first state, in which it adjusts the pressure level, and a second state, in which it does not adjust the pressure level.

20. The clutch system of claim 10, further comprising a pilot valve arrangement for selectively connecting said slave cylinder to said second pump arrangement, wherein a first valve state of said pilot valve arrangement allows said second medium provided by said second pump arrangement to flow to said slave cylinder to provide for the partial filling of said slave cylinder and a second valve state of said pilot valve arrangement prevents said second medium provided by said second pump arrangement to flow to said slave cylinder.

21. The clutch system of claim 17, wherein said pilot valve arrangement is selectively switchable to a further valve state for allowing medium to flow from said slave cylinder to empty said slave cylinder.

22. The clutch system of claim 10, further comprising a non-return valve arrangement connected between said slave cylinder and said second pump arrangement for preventing a flow of pressure medium from said slave cylinder to said second pump arrangement.

23. The clutch system of claim 10, further comprising a drain valve connected to said slave cylinder, said drain valve being selectively switcliable to a valve state for at least one of allowing pressure medium to flow from said slave cylinder to empty said slave cylinder and allowing second medium provided by said second pump arrangement supplied to said slave cylinder to flow away from said slave cylinder.

24. The clutch system of claim 10, further comprising an open loop/closed loop valve arrangement connected to said slave cylinder for selectively actuating said slave cylinder with the pressure medium, wherein an effective flow cross section of said open loop/closed loop valve arrangement is sufficient to allow medium which has been provided by the second pump arrangement and supplied to said slave cylinder to flaw away from said slave cylinder to hold said slave cylinder in one of an emptied and partially emptied state.

25. The clutch system of claim 10, further comprising a non-return valve arrangement between said first pump arrangement and said slave cylinder for preventing a flow of pressure medium from said slave cylinder to said first pump arrangement.

26. The clutch system of claim 22, further comprising a non-return valve arrangement between said first pump arrangement and said slave cylinder for preventing a flow of pressure medium from said slave cylinder to said first pump arrangement.

27. The clutch system of claim 22, further comprising a pressure accumulator arranged between said first pump arrangement and slave cylinder, wherein said non-return valve arrangement is arranged for blocking a discharge from said pressure accumulator from said first and second pump arrangements.

28. The clutch system of claim 3, further comprising a pressure accumulator arranged between said first pump arrangement and slave cylinder, wherein said non-return valve arrangement is arranged for blocking a discharge from said pressure accumulator from said first and second pump arrangements.

29. The clutch system of claim 26, further comprising a pressure accumulator arranged between said first pump arrangement and slave cylinder, wherein said non-return valve arrangements are arranged for blocking a discharge from said pressure accumulator from said first and second pump arrangements.

* * * * *